3,485,647
GLASS ARTICLE AND METHOD OF PRODUCTION

Roy V. Harrington, Corning, N.Y., assignor to Corning Glass Works, Corning, N.Y., a corporation of New York
No Drawing. Filed Dec. 18, 1964, Ser. No. 419,550
Int. Cl. C03c 3/04
U.S. Cl. 106—52          3 Claims

ABSTRACT OF THE DISCLOSURE

This invention relates to the strengthening of glass articles consisting essentially, by weight on the oxide basis, of about 45–75% $SiO_2$, 8–25% $Na_2O$, 5–25% $Al_2O_3$, and 2–20% $P_2O_5$ through a two-step consecutive ion exchange process wherein the first step comprises the replacement of sodium ions in a surface layer within the glass with lithium ions at a temperature above the strain point of the glass. The $P_2O_5$ acts to inhibit crystallization in the surface layer during this replacement of sodium ions by lithium ions.

---

United States Patent No. 2,779,136, granted to H. P. Hood and S. D. Stookey, discloses an ion exchange method of chemically strengthening an alkali metal silicate glass article containing sodium and/or potassium ions. This method involves introducing lithium ions into a surface zone on the article to produce a lithium silicate glass characterized by a lower coefficient of thermal expansion than the parent glass.

The patent further teaches that, if alumina is present, lithia will react with alumina and silica in the glass to form finely divided crystals of beta-spodumene. This substantially increases the degree of strengthening attainable providing a suitable mineralizing agent, such as titania ($TiO_2$), is present. Otherwise, the crystallization occurs in an uncontrolled manner at the glass surface and forms a material that tends to crack or spall from the article surface. This interferes with any type of chemical strengthening practice involving lithium ions. Even when properly controlled by a mineralizing agent, crystal formation normally renders the article opaque.

A companion application, Ser. No. 419,308, entitled "Glass Article And Method Of Production" has been filed of even date herewith in the names of R. A. Eppler and H. M. Garfinkel and assigned to a common assignee. This application discloses a consecutive ion exchange technique of chemical strengthening. Initially, a relatively large alkali metal ion from the glass is exchanged with a smaller alkali metal ion such as lithium at a temperature above the glass strain point in accordnce with the Hood-Stookey method. The resulting article, encased in a lithium silicate glass, is then given a second ion exchange treatment wherein a larger alkali metal ion is exchanged with the smaller lithium ion in the encasing glass layer. This second exchange is at a temperature below that at which stress is relieved in the glass.

Reference is also made to a further application filed of even date herewith, Ser. No. 419,307, entitled "Glass Article Having Increased Mechanical Strength And Method Of Production" filed in the name of J. S. Olcott and also assigned to a common assignee. This application discloses an alternative method of chemical strengthening by a consecutive ion exchange. The method differs from that of Eppler and Garfinkel in that the second ion exchange is effected by heating the article at an elevated temperature without strain relaxation for a period of time following the initial ion exchange. This causes large alkali metal ions from the central portion of the article to diffuse toward the glass surface and exchange with smaller alkali metal ions, thereby developing compressive stresses which increase the strength of the article.

A glass article strengthened in accordance with either of these procedures is characterized in that the article is formed from an alkali metal silicate glass wherein the primary alkali metal ion has a relatively large ionic radius; that glass in a core or central portion of the article has the structure of this alkali metal silicate glass; the article has an encasing zone of the glass which differs in molecular structure from the parent glass; the total alkali metal ion content on a mole basis is essentially the same throughout the glass; a portion of the positions normally occupied by the smaller alkali metal ion in the surface zone glass are occupied by the larger alkali metal ion; and the surface zone is thereby compressively stressed. In an article produced by the Olcott method, there is an intermediate zone of glass adjacent the compressively stressed surface zone into which the smaller ions displaced from the surface zone have migrated.

It is known that alkali metal silicate glasses containing a substantial amount of alumina or zirconia, that is at least about 5% of these oxides, have a phenomenally high potential for chemical strengthening by exchange of large for small alkali metal ions in the glass. However, glasses containing a substantial amount of zirconia have proven difficult to melt and form without the development of fine crystals. Alumina glasses are generally superior in this respect but, as pointed out earlier, tend to crystallize during the initial ion exchange.

It is therefore a primary purpose of the present invention to avoid these problems and thereby provide improvements in the strengthening methods and strengthened glass articles just described. Another purpose is to provide improved glasses for use in such strengthening procedures. A particular purpose of the invention is to inhibit the crystallization tendencies that exist in an aluminosilicate glass when lithium ions are introduced into the glass.

I have now found that the presence of a small amount of phosphorous oxide ($P_2O_5$) in an alumina glass tends to stabilize the glass against crystallization during lithium ion exchange, as well as against subsequent chemical attack. In particular, it tends to inhibit the development of beta-spodumene crystals when lithium ions are introduced into the glass during an ion exchange process.

My invention then resides in a method of inhibiting crystallization tendencies in an alkali metal aluminosilicate glass during an ion exchange in which lithium ions are introduced into the glass which comprises adding to the batch from which the glass is melted a material capable of providing $P_2O_5$ in the glass in an amount effective to inhibit crystallization but not over about 20%. It further contemplates an improved consecutive ion exchange strengthening method, and strengthened article, characterized in that the article is formed from a glass composed essentially of 45–75% $SiO_2$, 5–25% $Al_2O_3$, 8–25% $Na_2O$ and an amount of $P_2O_5$ effective to inhibit crystallization during lithium ion exchange but not exceeding about 20%.

In accordance with the characteristic feature of the invention, a material capable of providing $P_2O_5$ is incorporated as an additive in a batch composed of raw materials selected and proportioned to produce an alkali metal aluminosilicate ($R_2O$–$Al_2O_3$–$SiO_2$) base glass. The raw materials employed are not critical. For example, the base glass batch may include such conventional materials as sand, anhydrous alumina and soda ash. The source of $P_2O_5$ may conveniently be any available phosphate material, e.g. sodium pyrophosphate or aluminum metaphosphate, and is incorporated by mixing with the batch ingredients of the base glass.

The glass batch thus provided may be converted to a glass article of desired shape by conventional glass melting and forming pdactices. Thus, in the melting step, the batch is brought to a temperature within the range of 1500–1600° C. and held at such temperature for a time depending on the degree of homogeneity required in the melt. Normally, a crucible melt held for 16 hours at an optimum melting temperature will produce a glass of adequate quality. The optimum melting temperature for a glass batch will depend largely on the flux content of the glass primarily the alkali metal oxides and soda ($Na_2O$) in particular. In general, glasses having relatively low alkali metal oxide contents require higher melting temperatures.

Following the melting step, the glass is drawn into cane, rolled into sheet form, or otherwise formed to desired shape. In accordance with a particular embodiment of the invention, the glass article thus provided is then subjected to a double or consecutive ion exchange strengthening procedure of the type earlier described.

In the initial exchange, lithium ions replace larger alkali metal ions in a surface layer or zone on the glass article. The lithium ions are preferably provided by immersing the article in a molten salt bath composed of a lithium salt, either alone or in conjunction with one or more modifying salts. The bath is maintained above the glass strain point so that a new glass, characterized by a substantially increased number of lithium ion sites, is produced on cooling. Optimum strengthening is achieved with a zone of new glass about 2–4 mils in depth. Such a zone of ion exchanged glass may generally be produced in times ranging from a fraction of a minute to a half-hour at a temperature of 750° C., whereas several hours will normally be required at a lower temperature around 600° C. The ion exchange time may be correspondingly shorter where a lesser degree of strength is deemed sufficient.

The second ion exchange may, for example, be carried out in accordance with practices described in detail in the earlier mentioned Eppler et al. and Olcott applications. In either case, the exchange must occur under conditions of time and temperature such that stresses introduced by the ion exchange are not relaxed due to internal flow or rearrangement within the glass structure. Normally, the exchange is effected below the glass strain point, preferably about 50–100° C. below this temperature. In any event, the temperature must be at least about 300° C. to provide a reasonable rate of ion migration.

In the Eppler-Garfinkel form of consecutive ion exchange, larger alkali metal ions are again conveniently supplied by a molten salt bath, e.g. a sodium nitrate ($NaNO_3$) salt bath. The glass article is immersed in such bath for a period of time while sodium ions exchange with lithium ions, the latter diffusing out into the molten bath. The degree of strengthening attainable in this manner, up to a maximum value, varies directly with either temperature or time. An optimum degree of strengthening may normally be effected in the present glasses in a period of about 2–4 hours at a temperature about 100° C. below the glass strain point.

In the Olcott procedure, the second ion exchange is accomplished by heating the initially ion exchanged article in air for a period of time and at a temperature corresponding to those employed in the Eppler-Garfinkel method. In this case, the inner portion of the glass article serves as a reservoir of larger ions which migrate into the newly created lithium silicate glass of the surface layer in exchange for lithium ions. The latter, in turn, migrate into such inner portion of the article.

A consecutive ion exchange method as just described is of particular utility because it provides a strength increase that is retained for a substantial time during service at elevated temperatures as high as 500° C. Glassware which may be subjected to such high temperature service includes cooking utensils, electrical appliance components, and heating unit substrates and components.

In addition to strength retention characteristics, such products also require good chemical durability and surface quality or appearance. Factors of material cost and ease of melting and fabrication must always be considered. Also such heat resistant products normally cannot have an unlimited degree of strength imparted to them because this will cause violent scattering in the event that breakage does occur. Accordingly, this particular embodiment of my glass article desirably has a strength, as measured in terms of modulus of rupture (MOR) in pounds per square inch (p.s.i.), within a range of 25–40 thousand p.s.i.

Chemical durability may be determined in numerous ways, depending on the particular nature and degree of durability required for a selected application. For present purposes, acid durability, as determined by the conventional hot acid test, is of particular interest. In this test, a piece of ware is immersed in a 5% solution of hydrochloric acid at 95° C. for 24 hours, and durability is determined in terms of the weight loss from the glass in milligrams per square centimeter. In general, a glass that undergoes a weight loss greater than 0.5 mg./cm.$^2$ is considered to have inadequate durability.

In order to provide a glass article capable of meeting these qualifications after chemical strengthening by a consecutive ion exchange process, the present invention utilizes glasses composed essentially of 45–75% $SiO_2$ 2–20% $P_2O_5$, 5–25% $Al_2O_3$ and 8–25% $Na_2O$. For reasons hereafter discussed, it is desirable to employ glasses composed essentially of 45–70% $SiO_2$, 10–22% $Na_2O$, 10–22% $Al_2O_3$ and 4–15% $P_2O_5$.

Glasses composed entirely of alkali metal oxide and silica generally have poor durability characteristics and do not lend themselves well to chemical strengthening, particularly strengthening in depth to resist abrasion. Accordingly, it has been found desirable to introduce either alumina or zirconia to stabilize the glass and at the same time impart a greatly increased strengthening potential. Alumina is generally preferred for melting purposes and at least 5% is required for strengthening and durability purposes. Durability usually reaches a maximum value in glasses containing about 15–18% alumina and then drops off so that glasses containing over about 20% $Al_2O_3$ may have an inadequate durability, particularly at higher soda levels. Thus, with a soda content on the order of 8–15%, a somewhat higher alumina content may be employed before the loss of durability substantially exceeds the 0.5 mg./cm.$^2$ standard.

Silica is the basic glass forming oxide. At least 45% is necessary to provide a glass with adequate durability and strengthening potential.

It has been found that the presence of $P_2O_5$ in soda aluminosilicate glasses tends to avoid the surface defects of crystallization, crazing and/or wrinkling which are otherwise normally encountered during lithium ion exchange. Relatively minor amounts may provide a degree of crystal inhibition in some glasses. Normally, however, a minimum of at least 2% $P_2O_5$ in the glass is required and a content of at least 4% is optimum for present purposes. Suitable phosphate raw materials are generally more expensive than aluminosilicate materials such as feldspars and the like. Therefore, it is desirable that the $P_2O_5$ content not exceed about 10%. Otherwise, up to about 20% may be employed except as such larger amounts tend to have a deleterious effect on durability.

Sodium oxide ($Na_2O$) is the basic glass modifier and also provides ions for exchange with lithium in the initial exchange. At least 8% is necessary for such purposes and about 15–18% is generally the optimum amount for strengthening purposes. Up to about 25% may be tolerated under certain circumstances, but such larger amounts tend to impart lower chemical durability and a higher liquidus temperature. The latter makes melting and forming more difficult.

Other known glass-forming oxides, such as the other alkali metal oxides, the alkaline earth metal oxides, PbO, $TiO_2$, glass colorants, and fining agents, may be present in limited amounts of 1–5% each. Larger amounts generally tend to produce crystallization in the glass, loss of strengthening potential, or other deleterious effects.

By way of further illustrating the invention, reference is made to the following table which sets forth a series of glasses in terms of compositions calculated in weight percent on an oxide basis from the corresponding glass batch formulae. The table further presents certain relevant property measurements on the glasses as subsequently described.

Following the consecutive ion exchange treatments, each of the cane samples was subjected to a severe form of surface abrasion commonly referred to as tumble abrasion. In this abrasive treatment, a set of ten cane samples was mixed with 200 cc. of 30 grit silicon carbide particles and subjected to a tumbling motion for 15 minutes in a Number O ball mill jar rotating at 90–100 rpm. Each tumble abraded cane sample was then mounted on spaced knife edges in a Tinius Olsen testing machine. A continuously increasing load was applied to the cane, intermediate of and opposite from the supporting knife edges, until the cane broke in flexure. From the measured load required to break each cane, a modulus of rupture (MOR) value was calculated for the individual cane and an average value determined for each sample set.

TABLE I

|  | 1 | 2 | 3 | 4 | 5 | 6 | 7 |
|---|---|---|---|---|---|---|---|
| $SiO_2$ | 60 | 60 | 59 | 65 | 60 | 55 | 45 |
| $Al_2O_3$ | 18 | 16 | 20 | 15 | 20 | 15 | 15 |
| $P_2O_5$ | 5 | 7 | 4 | 5 | 5 | 10 | 20 |
| $Na_2O$ | 15 | 15 | 15 | 13 | 13 | 18 | 18 |
| $Li_2O$ | 1 | 1 | 1 | 1 | 1 | 1 | 1 |
| $K_2O$ | 1 | 1 | 1 | 1 | 1 | 1 | 1 |
| M.O.R. $\times 10^{-3}$ p.s.i.: |  |  |  |  |  |  |  |
| (1) Air heat | 42 | 47 | 38 | 40 | 35 | 43 | 38 |
| (2) Double salt | 60 | 54 | 55 | 47 | 58 | 57 | 46 |
| Wt. loss (mg./cm.²) | 0.05 |  | 0.33 | 0.03 | 0.28 | 0.08 |  |
| Appearance | Clear | Clear | Slight haze | Clear | Slight haze | Slight opal | Slight opal |

A glass batch corresponding to each of the foregoing compositions was mixed and melted and the glass drawn into quarter-inch cane. Such cane were cut into four-inch lengths which were divided into three groups for further treatment and testing.

One set of samples was weighed, immersed in a 5% solution of hydrochloric acid at 95° C. for 24 hours, then weighed again to determine the loss of glass in milligrams per square centimeter of article surface. The durability characteristic of significance is that of a surface after ion exchange. However, the consecutive exchange carried out with these glasses produced a surface essentially corresponding to the original and a corresponding durability value within the accuracy of the test. Therefore, chemical durability measurements were made on the parent glass for convenience.

The remaining two sets of cane samples were immersed in a molten salt bath composed of 75% by weight lithium sulfate and 25% sodium sulfate. The bath temperature was maintained constant at 750° C. Each set of cane samples was immersed for 10 minutes at this temperature to effect an exchange of lithium for sodium ions within a surface zone or layer of glass on the cane. After this ion exchange treatment, the cane samples were examined for visual appearance of their surface.

One set was then immersed in a second molten salt bath, composed of 85% sodium sulfate and 15% sodium chloride, for a period of two hours with the bath at a constant temperature of 450° C. This treatment produced consecutive ion exchanged samples in accordance with the Eppler-Garfinkel method referred to earlier. The other set was placed in an electrically heated oven operating at 450° C. and maintained at that temperature for 16 hours. This treatment was in accordance with the Olcott method earlier referred to.

The MOR data thus obtained are presented in Table I in thousands of p.s.i. under the identification "MOR $\times 10^{-3}$ p.s.i."

Data for the sets of samples given a consecutive ion exchange strengthening treatment by immersion in two consecutive salt baths are identified by the designation "double salt"; data for the samples given the lithium ion exchange followed by a heat treatment in ambient air are identified by the designation "air heat." Chemical durability data for the various glasses are identified by the designation "Wt. Loss (mg./cm.²)".

In addition to these data, the appearance of the glass samples is recorded as either "clear" or "slight haze." The former designation indicates a glass surface essentially free of visible crystallization; the latter indicates that a slight formation of crystals on the glass surface could be observed.

In the case of Examples 6 and 7, the glass surface was clear, but the initiation of opal formation in the body of the glass could be observed. Such separation of an opacifying crystal phase is characteristic of glasses with a relatively high $P_2O_5$ content. It may be acceptable or not depending on the degree of transparency required in a particular article.

The data presented in Table I illustrates the capability of minimizing crystallization and other surface defects while producing consecutive ion exchange strengthened glassware characterized by tumble abraded MOR values ranging from 25 to 60 thousand p.s.i. and adequate to excellent acid durability.

A further set of illustrative glass compositions, together with data for characteristic properties measured on corresponding glasses, are presented in Table II below. The data in all instances were obtained and are presented in the same manner as in Table I.

TABLE II

|  | 1 | 2 | 3 | 4 |
|---|---|---|---|---|
| $SiO_2$ | 50 | 55 | 63 | 50 |
| $Al_2O_3$ | 25 | 25 | 18 | 30 |
| $P_2O_5$ | 5 | 5 | 2 |  |
| $Na_2O$ | 18 | 13 | 15 | 18 |
| $Li_2O$ | 1 | 1 | 1 | 1 |
| $K_2O$ | 1 | 1 | 1 | 1 |
| M.O.R. $\times 10^{-3}$ p.s.i.: |  |  |  |  |
| (1) Air heat | 47 | 24 | 24 | Samples |
| (2) Double salt | 68 | 43 | 28 | Broke |
| Wt. loss (mg./cm.²) | 15.2 | 33.8 | 0.07 |  |
| Appearance | Slight haze | Crazed | Heavy crystals |  |

Examples 1 and 2 of Table II illustrate the capability of obtaining strengthened glassware having a marginal surface appearance with maximum amount of alumina. However, the acid durability of such glasses is very poor as indicated. Example 3 illustrates the tendency for surface crystallization to occur with relatively small amounts of $P_2O_5$ in a glass, and a somewhat lower degree of strengthening potential as compared with glass 1 of Table I. Example 4 illustrates the exrteme problems that can occur in a glass having an excess of alumina and an absence of $P_2O_5$. In general, these data indicate the desirability of providing at least 2% $P_2O_5$, and preferably on the order of 5% of this oxide, in a glass for present purposes. They further illustrate the desirability of maintaining the combined $Al_2O_3+R_2O$ content at a level not exceeding about 38% for acid durability purposes.

The invention is now specifically illustrated by describing preparation of the initial glass in Table I and tests on that glass demonstrating a particularly advantageous feature of a consecutive ion exchange strengthened glass article.

A glass batch having the following formula, and designed to provide a 1200 gram glass melt, was mixed:

|   | Grams |
|---|---|
| Sand | 720.0 |
| Anhydrous alumina | 201.0 |
| Aluminum metaphosphate | 76.0 |
| Sodium nitrate | 66.1 |
| Sodium carbonate | 268.0 |
| Lithium carbonate | 29.8 |
| Potassium carbonate | 17.6 |
| Arsenic oxide | 6.0 |

This batch was melted sixteen (16) hours in a covered platinum crucible in an electrically heated furnace at 1600° C. to produce a glass having a strain temperature of 553° C. This glass was drawn into cane for treatment and testing as described above.

Specifically, cane samples were immersed for ten (10) minutes in a lithium sulfate-sodium sulfate (75–25) salt bath at 750° C. This was followed by a sixteen hour heat treatment in air at 450° C. The surface appearance was excellent and tumble abraded strength was 42,000 p.s.i. Weight loss in mg./cm.$^2$ was 0.04 after 24 hours in 5% HCl at 95° C.; 0.01 after 24 hours in 5% acetic acid at 95° C.; 0.03 after 24 hours in 10% citric acid at 95° C.; 0.94 after 6 hours in 5% NaOH at 95° C.; 0.04 after 6 hours in N/50 $Na_2CO_3$ at 95° C.

Samples of the strengthened glass were then heated in air at various temperatures and times to determine strength retention characteristics. The samples were tumble abraded and strength tested as described above. The calculated MOR (in thousands of p.s.i.) corresponding to each heat treatment (in hours and ° C.) are set forth in Table III below.

TABLE III

| Temp. (° C.) | Time (hrs.) | MOR (thousands of p.s.i.) |
|---|---|---|
| 450 | 100 | 42 |
| 450 | 500 | 39 |
| 450 | 1000 | 36 |
| 500 | 100 | 27 |
| 500 | 500 | 20 |
| 500 | 1000 | 17 |
| 550 | 50 | 22 |
| 550 | 100 | 13 |
| 550 | 500 | 6 |

These data illustrate the substantial retention of strength after a thousand hours at 450° C., as well as a 50% retention after 50 hours at 550° C. Thus, glasses strengthened in accordance with this invention may withstand subsequent heat treatment varying from long terms at 450° C. to several minutes at temperatures in the 600–650° C. temperature range.

I claim:

1. A glass composition consisting essentially of 45–75% $SiO_2$, 8–25% $Na_2O$, 5–25% $Al_2O_3$ and 2–20% $P_2O_5$.

2. A glass composition consisting essentially of 45–70% $SiO_2$, 10–22% $Al_2O_3$, 10–22% $Na_2O$ and 4–15% $P_2O_5$.

3. A composition in accordance with claim 2 wherein the total content of alkali metal oxide plus $Al_2O_3$ does not exceed about 38%.

References Cited

UNITED STATES PATENTS

| 1,303,268 | 5/1919 | Drakenfeld | 106—52 |
| 1,964,629 | 6/1934 | Grimm et al. | 106—52 |
| 2,829,090 | 4/1958 | Eisenman et al. | 106—52 |
| 3,143,488 | 8/1964 | Arthur et al. | 106—52 |

HELEN M. McCARTHY, Primary Examiner

U.S. Cl. X.R.

65—30